Patented Jan. 12, 1932

1,840,322

UNITED STATES PATENT OFFICE

ERWIN KRAMER, OF COLOGNE-DEUTZ, LUDWIG ZEH, OF WIESDORF-ON-THE-RHINE, AND BERNHARD BOLLWEG, OF LEVERKUSEN-ON-THE-RHINE, GERMANY, ASSIGNORS TO GENERAL ANILINE WORKS, INC., OF NEW YORK, N. Y., A CORPORATION OF DELAWARE

NEW SULPHUR DYESTUFFS AND PROCESS OF MAKING

No Drawing. Application filed August 12, 1929, Serial No. 385,455, and in Germany October 13, 1928.

The present invention relates to new sulphur dyestuffs obtainable from the halogen substitution products of dinaphthylene-dioxide by sulphurization and to a process of preparing same.

According to the present invention, valuable sulphur dyestuffs are prepared by heating a halogenated dinapthylene-dioxide with sulphur or with an alkali metal polysulphide at an elevated temperature, say about 150–250° C., for several hours. Otherwise the process may be carried out by melting the dinaphthylene-dioxide compound with a mixture of sulphur and an alkali metal-sulphide or -polysulphide. If desired, the formation of our new dyestuffs can be effected by heating the starting components in an inert high-boiling organic solvent, such as nitrobenzene, trichlorobenzene and the like, to an elevated temperature, say 150–250° C., for several hours. From the melt the dyestuff is separated in the usual manner by dissolving in an aqueous alkali metal sulphide and precipitating the dyestuff from its solution by the addition of an acid. The starting dinaphthylene-dioxide compounds used for the purpose of our invention may be represented by the following general formula:

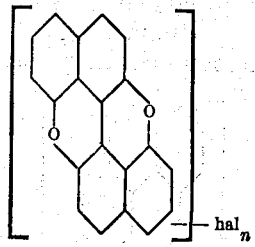

wherein "hal" stands for a halogen atom and "$n$" stands for one of the numbers one to ten. They are obtainable by halogenating in the usual manner dinapthylene-dioxide with the calculated amount of halogen or a suitable compound thereof, such as a sulphurylchloride and the like in a suitable high-boiling solvent, for example, nitrobenzene or trichlorobenzene. A process of preparing the above identified starting components is described in our copending application Ser. No. 385,475, filed August 12, 1929.

Our new sulphur dyestuffs are generally yellowish to blackish-brown powders, soluble in aqueous alkali metal sulphide solutions and dye cotton yellow to blackish-brown shades of excellent fastness properties. The shades vary with the halogen content of the starting material, and moreover the nature of halogen itself influences the product, bromine substitution products yielding considerably yellower dyestuffs than the corresponding chlorine derivatives.

The invention is illustrated by the following examples, without being limited thereto:

*Example 1.*—20 parts by weight of tetrachlorodinaphthylenedioxide are heated with 15 parts by weight of sulphur for 3 hours at 180–215° C. The melt is ground up and then dissolved with 150 parts by weight of crystallized sodium sulphate at 120–130° C. and separated in the customary manner. The dyestuff forms a dark powder, which dissolves in water with sodium sulphide with a red coloration and dyes cotton the same shades, which after hanging yields a reddish-brown. A similar dyestuff is obtained by carrying out the heating with sulphur in a high-boiling solvent, such as trichlorobenzene.

*Example 2.*—15 parts by weight of dichlorodinaphthylenedioxide are heated with 120 parts by weight of crystallized sodium sulphide and 48 parts by weight of sulphur for 7 hours at 180–200° C. The dyestuff is purified by dissolving with sodium sulphide, filtering and precipitating with acid. It is a brownish-yellow powder, dissolves with sodium sulphide with a yellow coloration and dyes cotton after hanging a yellowish brown, fast to boiling.

By using in this example trichlorodinaphthylenedioxide a reddish yellow brown dyestuff is obtained.

*Example 3.*—22.5 parts by weight of tetrachlorodinaphthylenedioxide are heated with 180 parts by weight of crystallized sodium sulphide and 96 parts by weight of sulphur for 7 hours at 180–200° C. The dyestuff is purified by dissolving the melt in water with 180 parts by weight of crystallized sodium sulphide, filtering and precipitating with acid. It is a reddish-brown powder, which dissolves in water with sodium sulphide with a red coloration, dyes cotton the same shade and after hanging yields a brownish-red of very satisfactory fastness to boiling and light.

*Example 4.*—15 parts by weight of pentachlorodinaphthylene-dioxide are heated with 120 parts by weight of crystallized sodium sulphide and 60 parts by weight of sulphur for 7 hours at 180–200° C. and worked up as described in Example 3. Thus is obtained a violet-brown powder, which dissolves in water with sodium sulphide with a red coloration and after hanging yields clear, very fast, reddish-brown dyeings on cotton.

*Example 5.*—25 parts by weight of tetrabromodinaphthylene-dioxide are heated with 120 parts by weight of sodium sulphide and 56 parts by weight of sulphur to 180–230° C. in the course of 12 hours. The dyestuff is purified by disolving with sodium sulphide and precipitating with acid. It is a yellowish-brown powder, which dissolves in water with sodium sulphide with an orange-yellow coloration and yields on cotton a yellowish-brown, fast to boiling and light.

*Example 6.*—25 parts by weight of hexachlorodinaphthylene-dioxide are heated with 180 parts by weight of crystallized sodium sulphide and 96 parts by weight of sulphur for 7 hours at 180–200° C. and worked up as described in Example 5. The dyestuff forms a dark brown powder, which dyes cotton blackish-brown from a sodium sulphide bath, exhibiting a red coloration.

On replacing the hexachloro derivative by decachlorodinaphthylene-dioxide and heating for 12 hours at 180–230° C. a gray dyeing sulphur dyestuff is obtained.

By the term "sulphurating agent" we mean sulphur, alkali metal polysulphides and mixtures of sulphur with an alkali metal-sulphide or poly-sulphide.

We claim:

1. The process which comprises sulphurating a dinaphthylene-dioxide compound of the general formula:

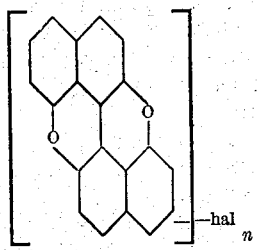

wherein "hal" stands for a halogen atom and "n" for one of the numbers one to ten, by heating the same with a sulphurating agent at a temperature of about 150 to about 250° C. for several hours.

2. The process which comprises sulphurating a dinaphthylene-dioxide compound of the general formula:

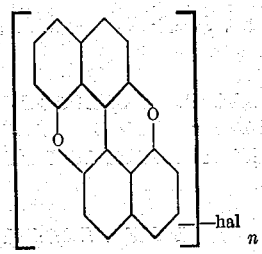

wherein "hal" stands for a halogen atom and "n" stands for one of the numbers one to ten, by heating the same in an inert high-boiling organic solvent with a sulphurating agent at a temperature of about 150 to about 250° C. for several hours.

3. The process which comprises sulphurating a dinaphthylene-dioxide compound of the general formula:

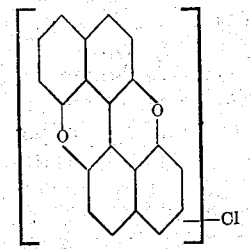

wherein "n" stands for one of the numbers four and five, by heating the same with a mixture of sodium sulphide and sulphur at about 180 to about 200° C. for several hours.

4. The process which comprises heating 22.5 parts by weight of tetrachlorodinaphthylene-dioxide with 180 parts by weight of crystallized sodium sulphide and 96 parts by weight of sulphur at a temperature of 180–200° C. for about 7 hours.

5. As new products the sulphur dyestuffs obtainable by sulphurating a dinaphthylene-dioxide compound of the general formula:

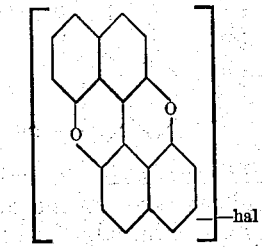

wherein "hal" stands for a halogen atom and "n" stands for one of the numbers one to ten, said dyestuffs being generally yellow to blackish-brown powders, soluble in aqueous alkali metal sulphide solutions and dyeing cotton yellow to blackish-brown shades of excellent fastness properties.

6. As new products the sulphur dyestuffs obtainable by sulphurating a dinaphthylene-dioxide compound of the general formula:

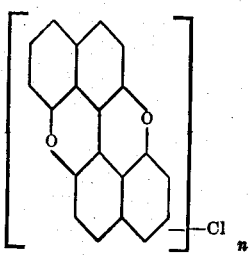

wherein "$n$" stands for one of the numbers four and five, said dyestuffs being reddish-brown to violet-brown powders, soluble in aqueous alkali metal sulphide solutions and dyeing cotton brownish-red shades of excellent fastness properties.

7. As a new product the sulphur dyestuff obtainable by sulphurating tetrachlorodinaphthylene-dioxide, being a reddish-brown powder, soluble in aqueous alkali metal sulphide solutions and dyeing cotton clear reddish-brown shades of good fastness properties.

In testimony whereof we have hereunto set our hands.

ERWIN KRAMER. [L. S.]
LUDWIG ZEH. [L. S.]
BERNHARD BOLLWEG. [L. S.]